United States Patent [19]

Bartsch

[11] 4,408,687
[45] Oct. 11, 1983

[54] POWER BRAKE FOR ARTICLE FEED APPARATUS

[75] Inventor: Walter F. Bartsch, Canton, Ohio

[73] Assignee: Figgie International, Willoughby, Ohio

[21] Appl. No.: 298,996

[22] Filed: Sep. 3, 1981

[51] Int. Cl.³ ............................................. B65G 35/00
[52] U.S. Cl. ..................... 198/491; 198/633
[58] Field of Search ............. 198/491, 425, 420, 633, 198/634, 956, 618; 53/497

[56] References Cited

U.S. PATENT DOCUMENTS

| | | | |
|---|---|---|---|
| 3,479,791 | 11/1969 | Wild | 53/497 |
| 3,978,970 | 9/1976 | Reimers | 198/425 |
| 4,088,221 | 5/1978 | Bowser | 198/491 |

Primary Examiner—Joseph E. Valenza
Assistant Examiner—Paul A. Sobel

Attorney, Agent, or Firm—Oldham, Oldham, Hudak, Weber & Sand Co.

[57] ABSTRACT

An article processing apparatus including a frame and feed conveyor on the frame for supply of a plurality of rows of abutted articles has provided therefore a stop member positioned above the feed conveyor and extending transversely of the rows of abutted articles, a power device operatively engaging said stop member to move it vertically downwardly to engage the tops of corresponding articles in all of the rows simultaneously to press them downwardly and prevent forward movement thereof whereby feed of articles into the apparatus can be controlled, and guide and connector means operatively connect the power device to the stop member to provide oscillation of it in a vertical plane to compensate for irregularity in engagement with a transverse row of articles.

6 Claims, 3 Drawing Figures

POWER BRAKE FOR ARTICLE FEED APPARATUS

TECHNICAL FIELD

In the packing of a large number of articles, and especially in industries, such as the soft drink industry or the like, a plurality of streams of abutted articles are fed into the machine as aligned rows of abutted articles. These articles then are fed to a case grid and are arranged in groups for filling cases or containers to be used for transportation and sale of the products. Flow of the articles to the case grid must be provided intermittently.

BACKGROUND ART

Heretofore there have been many different types of apparatus developed for the case packer field, and article brakes have been provided in certain of these prior patents including Copping U.S. Pat. No. 3,052,071. Such patent shows a plurality of individual brakes for engaging articles in different streams of abutted articles to stop, temporarily, flow of the articles downstream of the apparatus. While such prior type of brake has worked satisfactorily, it is always desirable to provide a less complicated apparatus, or one which is easier to maintain, operate and/or adjust than the prior apparatus.

In article packaging in the soft drink or other beverage field, frequently the number of bottles in the package case varies. Thus there can be 2, 3 or 4 or more rows in the case and there can be anywhere from 2 to 6 or more articles included in each row. Hence, it is very desirable in case packers to have them be able to alter readily the type of case being processed. This frequently involves changing the number of rows of abutted articles that are being fed into the case packer grid. In addition to the number of rows of articles being fed to the packer grid, also, the specific position of the bottles or articles to be restrained from flow into the grid will vary slightly in the direction extending longitudinally of the row of abutted articles being processed. Thus the article brake is just one of the various portions of the case packer that usually must be altered each time that the type of case being packed in the machine is varied, or if the article being processed is changed.

DISCLOSURE OF INVENTION

Accordingly, it is the general object of the present invention to provide a novel and improved bottle or article processing apparatus and particularly a universal article brake for stopping feed of corresponding articles in a plurality of rows of abutted articles such as those being processed in a case packer.

Another object of the invention is to provide a unitary brake device for use with a plurality of streams of abutted articles and to provide a single control and positioning means for such article brake whereby such one brake device can control corresponding articles in a variable number of rows of abutted articles simultaneously.

Other objects of the invention are to make article and bottle processing apparatus easier to maintain and adjust in relation to the number of rows of articles being processed, to provide a brake means that automatically adjusts for slight variation in article size or location, and which can be adjusted upstream or downstream short distances as desired, to provide a low power consumption article brake, to form a fast reaction article brake, and to provide a sturdy, efficient uncomplicated brake apparatus that will provide a long effective service lift in the article processing field.

The foregoing and other objects and advantages of the invention will be made more apparent as the specification proceeds are achieved by: a unitary brake which comprises a stop brake member positioned above a feed conveyor to extend transversely of a variable number of rows of abutted articles on the feed conveyor for supply to an article collection area, and a power device operatively engaging the stop member to move it vertically downwardly to engage the tops of corresponding articles in all of the rows simultaneously to press them downwardly and prevent forward movement thereof so that feed of articles to the collection area can be controlled.

BRIEF DESCRIPTION OF DRAWINGS

Reference now is made to the accompanying drawings wherein.

When referring to corresponding members shown in the drawings and referred to in the specification, corresponding numerals are used to facilitate comparison therebetween.

BEST MODE FOR CARRYING OUT THE INVENTION

Figure 1:
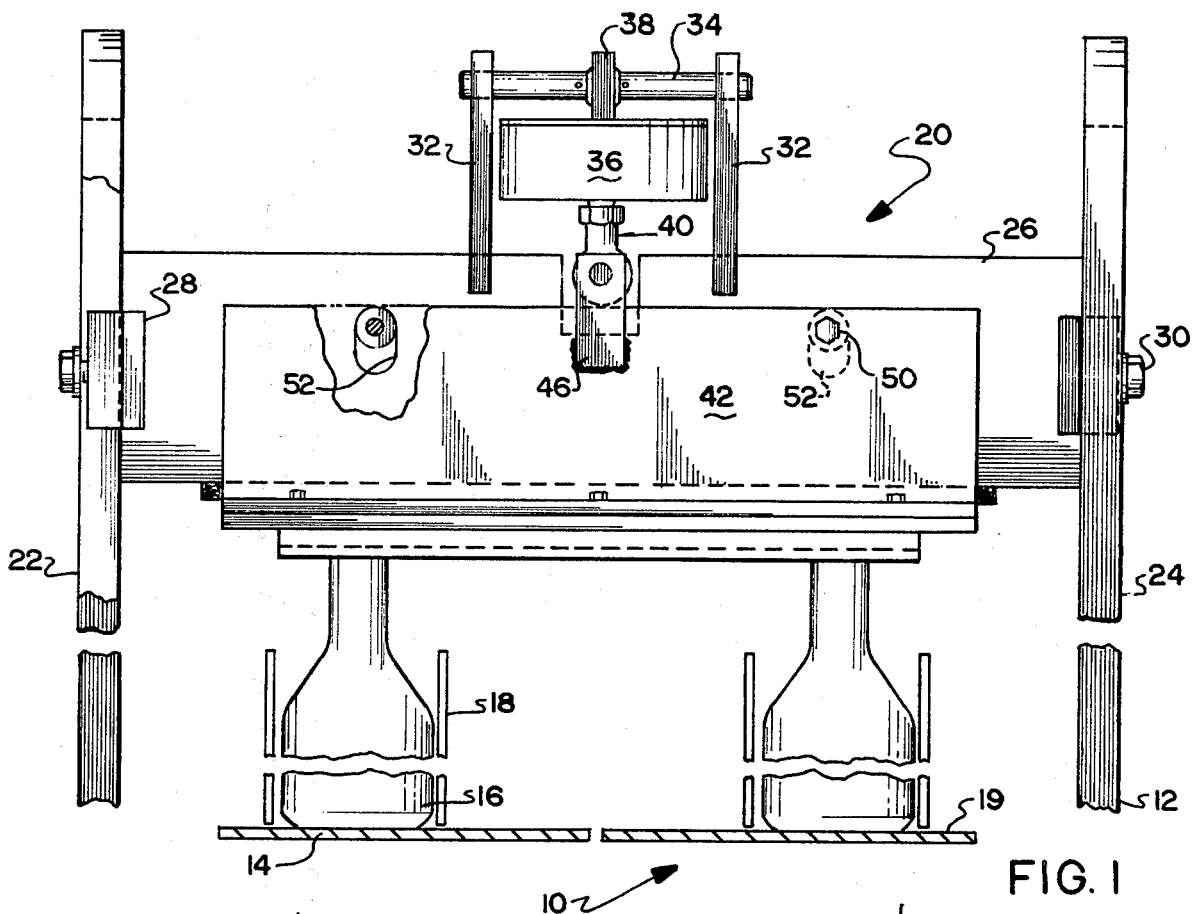
FIG. 1 is a fragmentary elevation of a power brake apparatus, embodying the principles of the invention, for an article packer.
Figure 2:
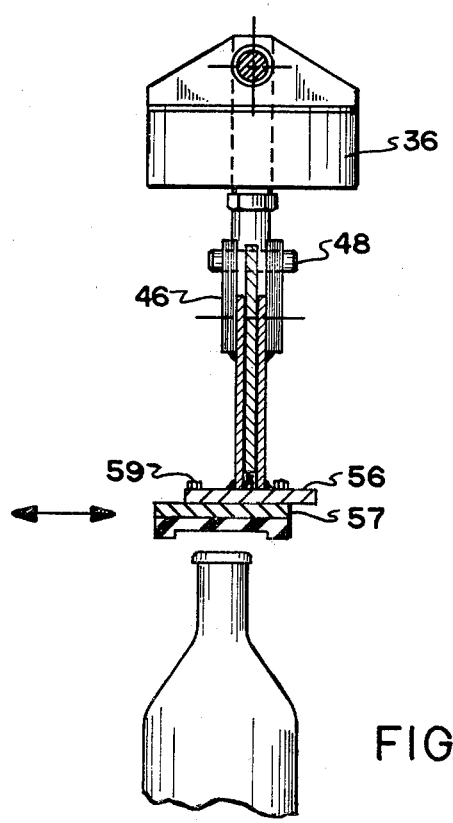
FIG. 2 is a fragmentary vertical section of the brake apparatus of FIG. 1 taken with the brake in its inoperative position.

The apparatus of the invention in general relates to, for example, an article caser apparatus 10 that includes a frame 12 of conventional construction. An article feed conveyor 14 is shown in FIG. 1 and wherein a plurality of streams of abutted articles 16 can be moved downstream of the apparatus between partition plates 18 for collection into article groups for case filling action, as is well known in the trade.

A brake means indicated as a whole by the numeral 20 is provided in the article caser 10 which brake means is provided prior to flow of the streams of abutted articles 16 to a grid head where the articles are separated from the streams into groups of articles ready for deposit into a case to fill the same. These brake means 20 are supported on a part of the frame 12 particularly including a pair of uprights 22, 24 on the frame and extending upwardly therefrom on opposite sides of the article supply conveyor 14. These uprights support and position a cross-plate 26 secured to the uprights in a vertically adjustable manner by any conventional means such as lock blocks 28 secured to the cross plate at opposite ends thereof. Lock screws or equivalents 30 engage vertical extending slots in these uprights 22 and 24 and are secured to the lock blocks to retain the cross-plate 26 in a desired vertical position. Thus the vertical position of the cross-plate 26 in relation to the article supply conveyor 14 can be varied readily by the operator to be dependent upon the height of the article, containers or bottles 16 being processed.

This cross-plate 26 has a pair of upwardly extending arms 32 thereon and these arms have a support rod or shaft 34 suitably secured thereto and extending therebetween so that such shaft or rod 34 is in a fixed vertical position and extends transversely of the article feed or supply conveyor 14.

The brake means 20 has an article slide plate 19 thereunder at the discharge end of the conveyor 14, as such conveyor normally terminates immediately upstream of the brake.

The actual movable brake apparatus of the invention comprises a power control or actuator device 36, that can be either electrically or pneumatically controlled as by a solenoid, a power cylinder etc., and have an outlet member. Such device 36 is attached to the support shaft or rod 34 as by a flexible universal joint type of a bearing 38 whereby the power device can be oscillated in any desired direction a short distance in relation to the support shaft 34. The outlet member of the power device 36 comprises a rod or ram that is coupled to any typical connector member such as an eye bolt 40 or the like. This eye bolt 40 is suitably operably connected to the output member of the power device 36 to be reciprocated on its vertical axis to be moved to and from upper and lower controlled positions. The bolt 40 has some vertical adjustment in relation to the power device 36. Such bolt 40 in turn connects to and positions a pair of control plates 42 and 44 that are slidably engaged with opposite sides of the cross-plate 26. The plates 42 and 44 are positioned by connector bars 46 operably secured to the bolt 40 by a pin device 48 and with the bars 46 being welded to the individual control plates 42 and 44. Pin device 48 permits limited rotary movement of the plates 42 and 44 in a vertical plane including the line of articles stopped.

The actual sliding action of the control plates 42 and 44 is facilitated and controlled by means of tie bolts 50 engaging such plates and extending through slots 52 in the cross-plate 26. These slots 52 extend veritcally, and the bolts 50 form a slidable unit of the control plates 42 and 44 but yet permit them to be moved vertically of the cross-plate by suitable actuation or release of the power device 36, as desired.

Figure 3:
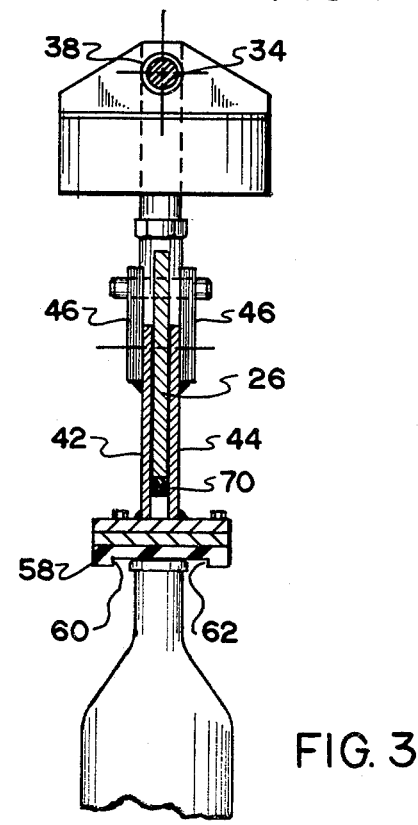
FIG. 3 is a fragmentary vertical section like FIG. 2 but with the power brake apparatus in its actuated or braking position.

At the lower end of a unit formed of the control plates 42 and 44, the plates are secured together as by a bottom plate 56. This bottom plate has a resilient lower plate 58 that is of flattened U-shaped in section as indicated in FIG. 3 suitably secured thereto. Such article contact plate 58 has two edge flanges 60 and 62 thereon that extend transversely of the conveyor 14 and the plates 56 and 58 are of such length as to cover all possible rows of articles being processed. The bottom plate 58 is made from a resilient material to cushion impact between the articles being processed and the bottom braking plate assembly. Also, the flanges 60 and 62 aid in preventing any slip-out of the bottle or articles processed in relation to the brake plate 46.

Obviously the forces applied by the bolts 50 can be varied so that the control plates 42 and 44 readily will slide vertically on the cross-plate 26.

It should be noted that the cross-plate 26 has the one slide plate assembly formed thereon by the control plates 42 and 44 which in turn position one elongate brake plate 56 thereon. Such brake plate extends the full width of the article supply conveyor 14 and it only needs to move vertically a short distance to and from article engaging positions so that only a minimum amount of power is required by the power device 36 to set the brake plate into braking position or to lift it therefrom as desired.

By the novel joint 38 and pin 43 mounting of the brake plate unit, it will automatically adjust for slight variations in the article positioning and/or height of the articles processed, and it inherently compensates or adjusts to the number of rows of articles being processed to control the same.

Obviously with changes in sizes or height of the articles being processed, then the worker must adjust the vertical position of the cross-plate 26 and its assembly in relation to the article supply conveyor 14 and frame 12.

The vertical height of the entire article brake unit mounted on the plates 40 and 42 in relation to the articles processed can readily be varied short distances by the engagement of the bolt member 40 with the threaded stud or output rod of the power means 36.

When the unitary brake member of the invention is released, it is drawn upwardly positively by the power device 36. To avoid unnecessary noise and pounding in the apparatus, a resilient cushion 70 is suitably positioned at the lower end of the mounting plate 26. Such cushion is of a size and the motion available for the power brake apparatus is such that the cushion 70 will be struck by the bottom plate 56 prior to the power device 36 bottoming in its raised inactive position.

Yet another feature of the present apparatus is that the bottom plate 52 is adjustably positioned for movement on the axis or line of movement of the rows of abutted articles by a carrier plate 57 that engages the plate 56. Such plate 56 is fixedly secured to the plate 42 and 44. The carrier plate 57 is provided with upwardly extending support means or bolts 59 that releasably engage slots in the bottom plate 56 or other equivalent means are present whereby the plates 57 and 58 can be moved in a direction longitudinally of flow of articles in the apparatus in which the brake member is position. Hence, the brake means is readily unitarily adjustable for slight variation in the positions of the corresponding articles in the rows of articles being processed to stop the articles in desired longitudinal flow relation to the article feed area where the articles are grouped, as for case filling action.

Suitable power supply tubes or lines (not shown) connect to the power device 36 to actuate its output ram or rod.

The unit of the invention works quickly and forms an effective unitary brake means for all of the rows of abutted articles being processed. The brake unit is easily adjusted vertically to be in operative relation to the tops of the articles being processed and the brake unit will self adjust in position slightly with pressures applied to the bottom plate 58 by the articles being processed.

Any suitable frame device can support this cross-plate 26 or equivalent device so that it extends transversely of the flow of articles into the apparatus whereby a unitary braking action can be obtained for all rows of articles being processed so that complete shut-off, or release of the article flow is provided, and the device will function for article stop action for whatever number of rows of articles that are supplied.

While one complete embodiment of the invention has been disclosed herein, it will be appreciated that modification of this particular embodiment of the invention may be resorted to without departing from the scope of the invention.

What is claimed is:
1. In article processing apparatus including a frame and feed conveyor on the frame for supply of a plurality of rows of abutted articles, the improvement comprising
- a stop member positioned above said feed conveyor and extending transversely of the rows of abutted articles,
- a power device operatively engaging said stop member to move it vertically downwardly to engage the tops of corresponding articles in all of said rows simultaneously to press them downwardly and prevent forward movement thereof whereby feed of articles into the apparatus can be controlled, and
- a guide means engages and positions said stop member for slide movement in a vertical plane, and a connector means connects said power device operatively to said stop member to provide limited rotation of said stop member in a vertical plane to compensate for irregularity in engagement of said stop member with a transversely extending row of articles, said vertical plane having said row of articles included therein.

2. In article processing apparatus including a frame and an article feed conveyor on the frame for supply of a plurality of streams of abutted articles, the improvement comprising
- a frame section positioned above said feed conveyor,
- a stop member positioned above said feed conveyor and extending transversely of any streams of abutted articles supplied, the streams of abutted articles having rows of transversely aligned articles therein,
- a powered control device engaging said stop member to move it vertically downwardly to engage the tops of a transverse row of corresponding articles in all of said streams simultaneously to press them downwardly and prevent forward movement thereof, and
- a guide plate engaging and positioning said stop member for vertical slide movement, and said control device operatively connected to said guide plate by a means to provide arcuate movement of said guide plate and stop member in a vertical plane that intersects a stopped row of transversely extending articles.

3. In article processing apparatus as in claim 2, where said guide plate is connected to said control device by a single ball joint to provide oscillation of said stop member in relation to said control device.

4. In article processing apparatus as in claim 2, where said stop member includes a layer of resilient material that has transversely extending edge flange means thereon to aid in engaging with the tops of articles being processed.

5. In article processing apparatus including a frame and an article feed conveyor on the frame for supply of a plurality of streams of abutted articles, the improvement comprising
- a frame section positioned above said feed conveyor,
- a stop member positioned above said feed conveyor and extending transversely of any streams of abutted articles supplied, the streams of abutted articles having rows of transversely aligned articles therein,
- a powered control device engaging said stop member to move it vertically downwardly to engage the tops of a transverse row of corresponding articles in all of said streams simultaneously to press them downwardly and prevent forward movement thereof;
- means securing said frame section to said frame to provide unitary movement of said stop member vertically in relation to said article feed conveyor; and
- a pair of guide plates engaging and positioning said stop member to sandwich a portion of said frame section therebetween and where means engage said guide plates and frame section to limit relative movement therebetween to sliding movement of said guide plates in a vertical plane.

6. In article processing apparatus including a frame and an article feed conveyor on the frame for supply of a plurality of streams of abutted articles, the improvement comprising
- a frame section positioned above said feed conveyor,
- a stop member positioned above said feed conveyor and estending transversely of any streams of abutted articles supplied, the streams of abutted articles having rows of transversely aligned articles therein,
- a powered control device engaging said stop member to move it vertically downwardly to engage the tops of a transverse row of corresponding articles in all of said streams simultaneously to press them downwardly and prevent forward movement thereof; and
- a carrier plate positioning said stop member in relation to the rest of the apparatus, and bolt and slot means securing said stop member to said carrier plate to provide adjustment in position of said stop member on the axis of article movement.

* * * * *